(12) United States Patent
Pletka et al.

(10) Patent No.: US 7,802,102 B2
(45) Date of Patent: Sep. 21, 2010

(54) METHOD FOR EFFICIENT AND SECURE DATA MIGRATION BETWEEN DATA PROCESSING SYSTEMS

(75) Inventors: Roman A. Pletka, Horgen (CH);
Patrick Droz, Rueschlikon (CH);
Christian Cachin, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 11/552,241

(22) Filed: Oct. 24, 2006

(65) Prior Publication Data
US 2008/0098217 A1    Apr. 24, 2008

(51) Int. Cl.
*H04L 9/32* (2006.01)
*H04L 29/06* (2006.01)
(52) U.S. Cl. .................. 713/181; 713/165; 713/159
(58) Field of Classification Search .................. 713/150, 713/155, 159, 164, 165, 168, 172, 181, 189; 726/26, 27; 707/1, 10, 200, 201, 204
See application file for complete search history.

(56) References Cited

U.S. PATENT DOCUMENTS 7,240,197 B1 * 7/2007 Yamagami et al. .......... 713/168
2005/0081039 A1 * 4/2005 Lee et al. .................... 713/176

* cited by examiner

*Primary Examiner*—Edan Orgad
*Assistant Examiner*—Jahangir Kabir
(74) *Attorney, Agent, or Firm*—Stephen C. Kaufman; Daryl Neff (57) ABSTRACT

The present invention provides a method for transferring encrypted information from one storage area to other storage area wherein cryptographic data protection scheme having protection attributes are applied on the data. A crypto container having cryptographic properties represents cryptographically protected data. The attributes that have been attached to the container at the time when data is added or removed from the container determine the scheme of data protection being applied. Crypto container can be converted or serialized for storage or transmission, here the conversion spread only to the protected data parts which possibly includes crypto containers in protected form but may not the attached crypto attributes. These attributes must be stored or transmitted in another form.

5 Claims, 11 Drawing Sheets

METHOD FOR EFFICIENT AND SECURE DATA MIGRATION BETWEEN DATA PROCESSING SYSTEMS

FIELD OF INVENTION

The present invention relates to a method for efficient and secure data migration between data processing systems. More particularly, the invention relates to the field of cryptography for secure transmission or migration of data between data storage systems.

BACKGROUND OF THE INVENTION

In storage systems cryptography may be used to protect data at rest (i.e., when residing on a storage medium) and data in motion (i.e., when traversing a network between components of a storage system). Cryptography refers to the art or science of converting information from its normal comprehensible format into an incomprehensible format rendering it unreadable without secret knowledge and thereby protecting it from illegitimate access. Such unreadable format of data or converted data is called ciphertext. The following two types of cryptographic methods mentioned below are known:

a) Symmetric cryptography (Secret-key cryptosystems)

b) Asymmetric cryptography (Public-key cryptosystems)

A wide variety of cryptographic algorithms are known for both types of cryptography mentioned before. These cryptographic algorithms result in a wide variety of cryptographically secure systems each based on one of the two types of cryptographic methods listed above or on a combination of them.

Figure 1:
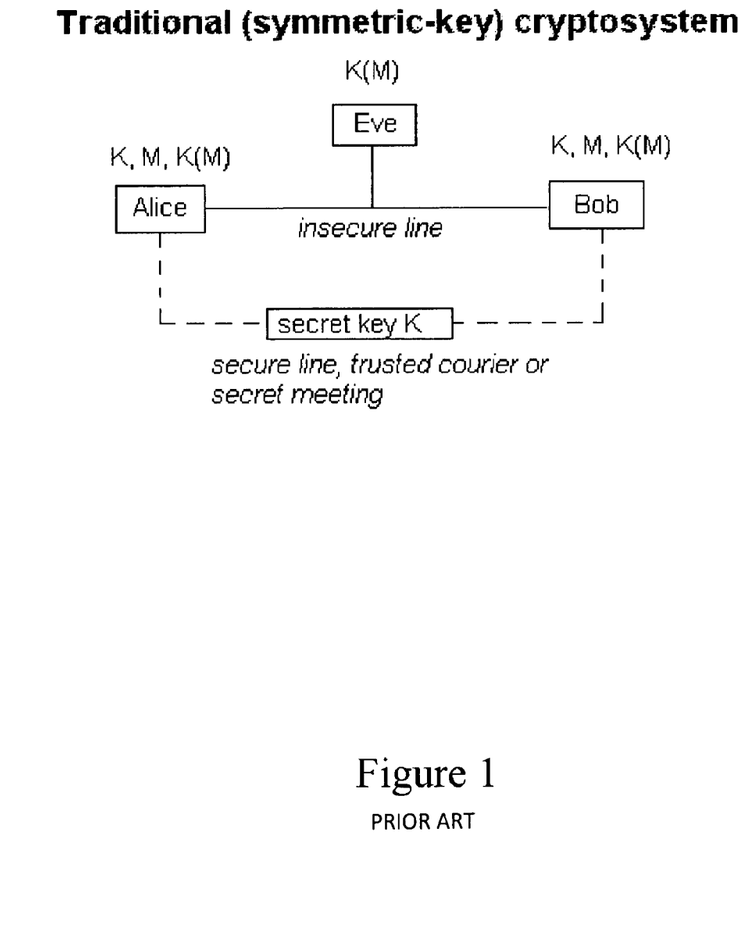
FIG. 1 shows an example of symmetric cryptography known in the prior art.

FIG. 1 shows an example of symmetric cryptography wherein plaintext is encrypted with a shared or secret key at one site. The result is called ciphertext; it is then transferred to another site, which decrypts it with the help of the key known and shared between the two sites. Note that in this process the same key is used for encryption and decryption therefore the process is called symmetric-key cryptography. The parties in the example are called Alice, Bob, and Eve. Alice and Bob are friends exchanging encrypted messages. Eve is an eavesdropper, trying to read the messages being exchanged between Bob and Alice. In symmetric algorithms as shown, Bob needs to send the encryption key information to Alice or they have to agree on a single key in order to exchange protected messages. [The letters above each party indicate what he or she knows. M represents a message being sent from Bob to Alice, and K(M) represents the enciphered message. To decipher the message, Alice simply applies K to K(M).]

Figure 2:
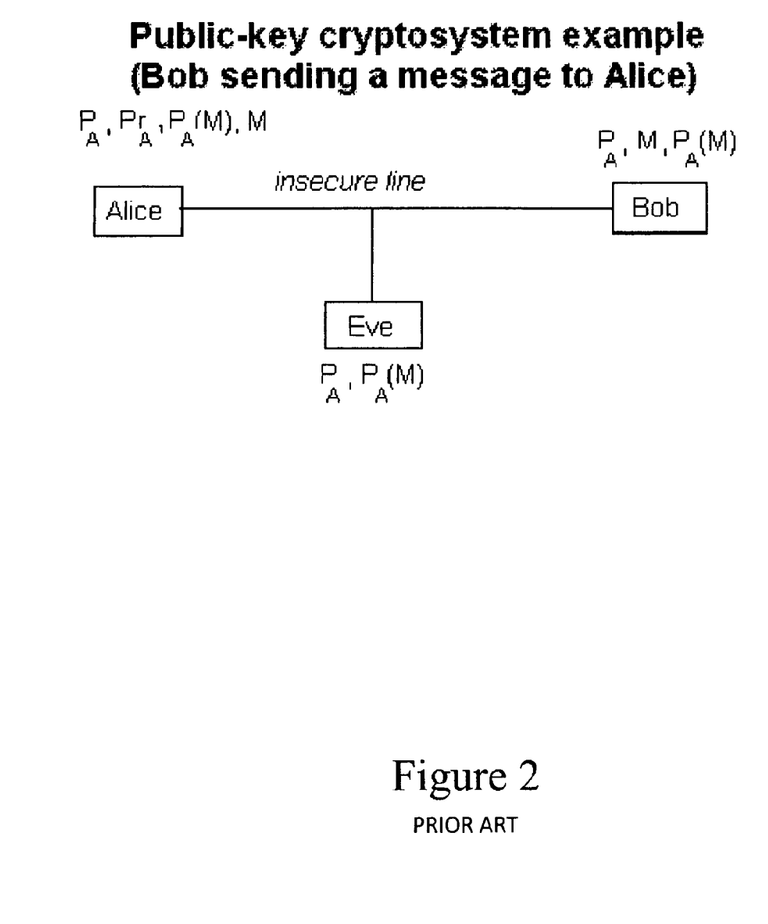
FIG. 2 shows an example of asymmetric cryptography known in the prior art.

FIG. 2 illustrates an example of asymmetric cryptography. In asymmetric algorithms each party uses two keys, a public key and a private key. The public keys are published to every one—even Eve knows them—while each party keeps its private key secret. When Bob wants to send a message M to Alice he encrypts the plaintext with the public key of Alice $P_A$. Then the encrypted data $P_A(M)$ is sent to Alice who decrypts said data with the private key of Alice $Pr_A$ that is known only to her. Even though Eve knows $P_A$ and $P_A(M)$, Eve can't recover the message without Alice's private key. [Again, letters near each box indicate what each party knows. M is the message Bob sends to Alice (he knows it since he wrote it, and Alice knows it since she has deciphered it). $P_A(M)$ represents the message enciphered with Alice's public key. To get M from $P_A(M)$, Alice applies $Pr_A$ to $P_A(M)$.]. The most widely used asymmetric cryptographic algorithm today is the Rivest-Shamir-Adleman (RSA) algorithm.

Figure 3:
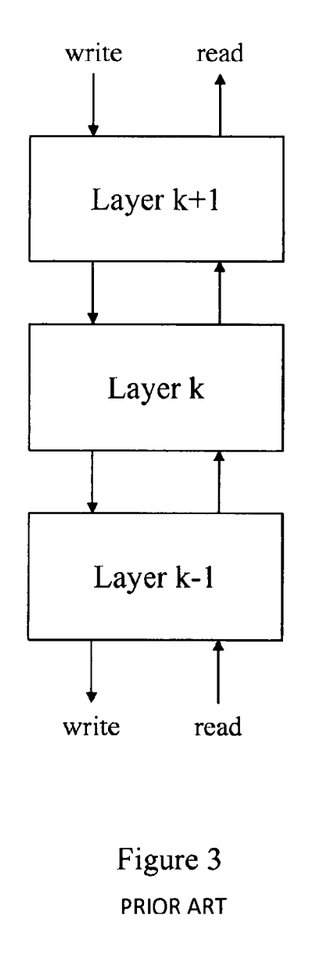
FIG. 3 shows a layer of a layered data processing system known in the prior art.

FIG. 3 shows an embodiment of a layered data processing system. Typical examples of layered data processing systems are data storage systems and data communication systems. A layered data processing system consists of a stack of data processing layers that offer the same set of interfaces for reading and writing data. An application writes data to the layer at the top and reads data from the layer at the top. Intermediate layers transform the data in a layer-specific way. The layer at the bottom handles the physical transmission or storage of the data.

Figure 4:
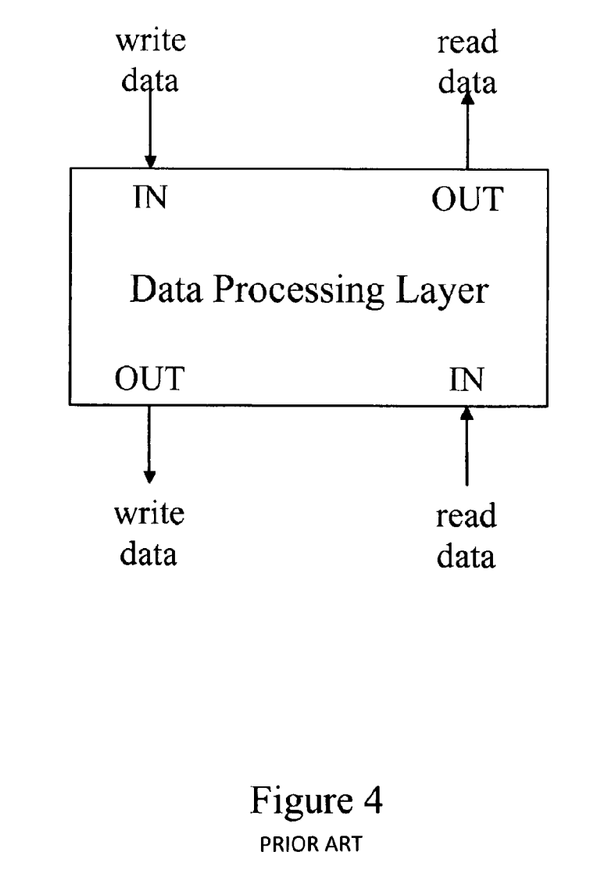
FIG. 4 shows a layered data processing system known in the prior art.
Figure 5:
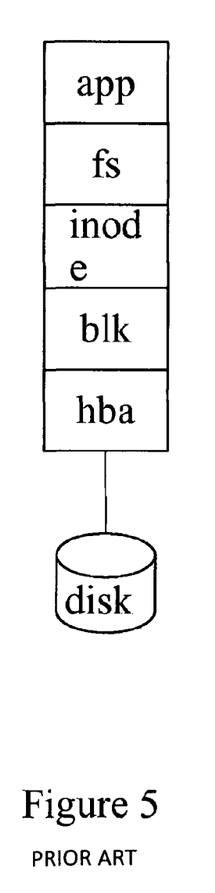
FIG. 5 shows the layered structure of a storage system known in the prior art.

FIG. 4 shows one layer in a layered data processing system. The layer may receive write input data from the layer or an application above, transform it in a layer-specific way, and output the result to the layer below. The layer may also receive read input data from below, transform it in a layer-specific way, and output the result to the layer above. The data storage systems of common computer operating systems are typically organized as layered data processing systems. They consist of the data processing layers mentioned below and illustrated in FIG. 5. An application accesses the stored data through a file system interface (fs), which provides the means to write and read data to and from files in byte-sequences of arbitrary length, to group files into directories, and to organize directories and files into a hierarchy. The file system layer (fs) typically translates file system operations into operations on byte containers of variable size, which are known as "inodes" in traditional UNIX file systems or as "objects" in object storage areas. The object layer (obj) transforms these operations into accesses to a block interface, which provides only read and write operations on fixed-length data blocks or sectors, which are typically 512 bytes long. Many data storage devices, such as disks, offer the block interface at the block layer (blk). The layer of the host-bus adaptor (hba) transfers the data to the disk subsystem. A disk subsystem usually contains additional layers internally, for example layers for adding error-correcting or error-detecting codes and for accessing the magnetic media.

A similar layered structure is found also in data communication systems, such as telephone networks and computer data networks, and in many other data processing systems. Commonly known data communication systems might be placed inbetween any layers of a data storage system in order to allow for remote data storage using a networking infrastructure.

Layered data storage systems and layered data communication systems are collectively referred to as layered data processing systems.

Cryptographic protection schemes can be applied at any layer of a layered data processing system. Depending on the layer, they provide different security guarantees to the overall system. A security mechanism protects data only at the layer in which the mechanism is applied between the communication end-points at the said layer. Also data processed at some layer is typically opaque i.e., the layer does not know anything about the structure of the data. However, there are data processing systems that make certain heuristic assumptions about the form of the arriving data, in particular to achieve greater efficiency. For example, analog telephone modems and tape drives apply data compression to save bandwidth and gain efficiency.

In the case of a layered data storage system mentioned before, cryptographic protection is commonly applied at the block layer or at the file layer.

If encryption is provided at the block layer, where data is divided into blocks of fixed length, encryption is performed on all blocks of data with a single key. The benefits of this system are simplicity and efficiency. The drawback is that anyone with access to the block storage device can decrypt all the information. Encryption at the block layer can be advantageous for instance in tape archival devices where a single key per tape is required.

If encryption is provided at the file-system layer a different key is used for every file. The advantage of this system is that fine-grained protection is possible because access to the file-encryption key can be controlled depending on the access permission of the file. An attacker with access to any layer below, for example the block layer, gains only access to the files that it is allowed to read.

Numerous methods have been developed for transmitting data in a secure manner between layered data processing systems using cryptography. Most methods in the prior art for transmitting and migrating data from a first data processing system to a second data processing system decrypt on the first processing system the encrypted data stored on the said first processing system with a key associated to the said first data processing system before the actual transmission or migration of data to the second processing system takes place. The said data is encrypted again on the second data processing system after it reaches its destination, the second data processing system, with a key associated with said second data processing system. This incurs an additional overhead of decrypting the data before migration and performing the process of data encryption more than once.

An example of the aforementioned situation is when data stored on a cryptographic file system is written to a tape archival device for backup. Typically a backup application first reads the data from the file system and thereby decrypts the data with the associated file key. Later, it re-encrypts the data with the key maintained by the tape backup device. In such cases, additional overhead is incurred due to transformation of data from one encrypted format to another which can be avoided. Analogously, data communication systems might re-encrypt already encrypted data unnecessarily.

The aforementioned problem is further aggravated due to a layered structure found in most of the storage systems and, more generally, also in other layered data processing systems. Such data processing systems are connected through their standard interfaces at the top layer, so the data must be decrypted before leaving the first system, and re-encrypted again at the destination. This incurs an overhead that can be prohibitive for large amounts of data.

It would therefore be desirable to provide a method for efficient and secure data migration between layered data processing systems.

OBJECTIVES AND SUMMARY OF THE INVENTION

It is an objective of the present invention to overcome the aforementioned drawbacks and provide a secure and efficient data migration method in storage systems.

It is an objective of the present invention to reduce the overhead of encryption-decryption-encryption process.

It is an objective of the present invention to provide efficient security to smaller and high capacity removable storage devices.

It is still another objective of the present invention to enhance the interface of the data processing system with the help of protection attributes.

It is still another objective of the present invention to provide security in distributed storage environments in an end-to-end view.

It is yet another objective of the present invention to provide secure and efficient method for electronic data migration.

It is yet another objective of the present invention to assure that already encrypted data is sufficiently secure encrypted by using protection policies.

It is yet another objective of the present invention to provide a method for defeating attacks such as fabrication and interception on storage systems.

The foregoing objectives are achieved by a method for cryptographically securing data in a secure computing environment which facilitates secure and efficient migration of data between data processing systems.

The present invention relates to data processing systems that employ cryptography for protection of data, wherein the encrypted data is migrated or transferred in its encrypted format keeping most of the features of the encrypted data intact, to another data processing system and the said transferred data need not be encrypted again at the destination. The invention thereby enables migration or transfer of data between layered data processing systems, such as disk storage and tape storage, without performing decryption or encryption of the bulk data more than once. Protection can be provided cryptographically at any given layer of a layered data processing system. The type and level of security depends on the granularity and the layer at which data is protected. Layers can be augmented with protection policies to ensure that already encrypted data is sufficiently secure encrypted. A security mechanism protects data only at the layer in which the mechanism is applied and between the communication end-points at the given layer.

BRIEF DESCRIPTION OF THE DRAWINGS

The present invention is described with the help of accompanying drawings.

DETAILED DESCRIPTION OF THE INVENTION

Figure 6:
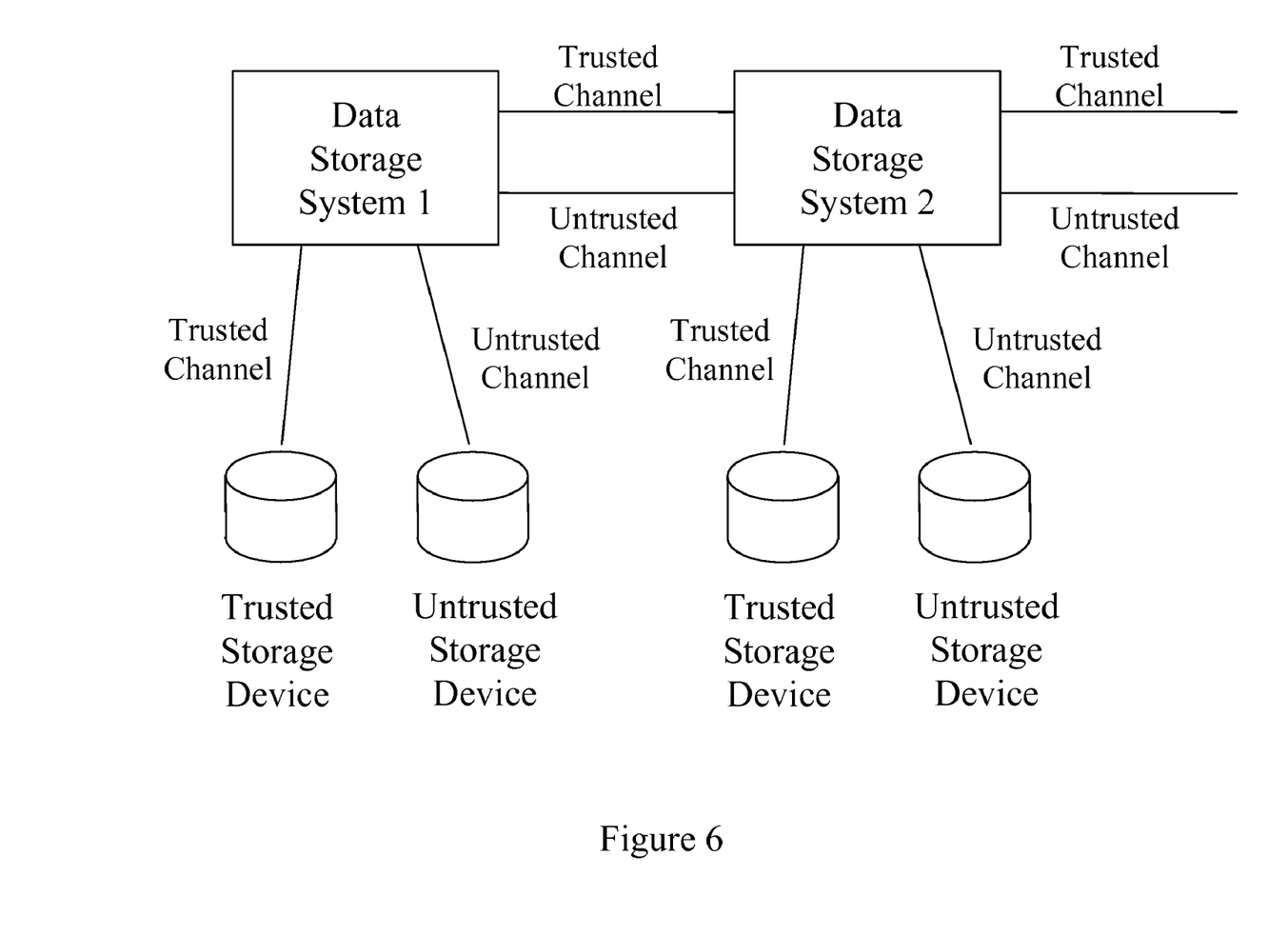
FIG. 6 shows an overview of a storage system of the invention
Figure 7:
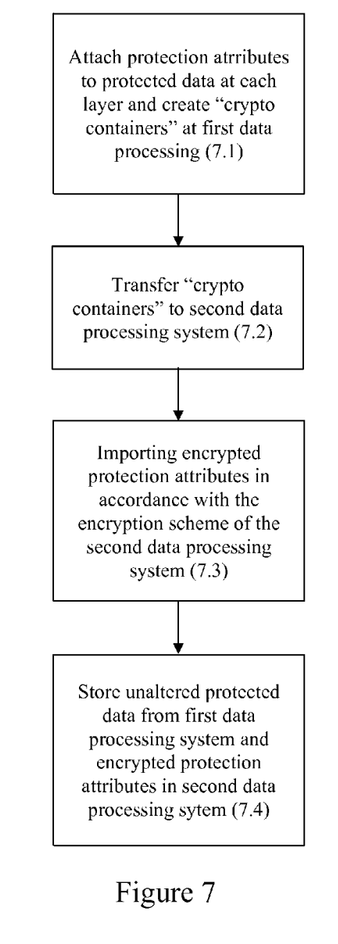
FIG. 7 shows an embodiment of the invention of the process of transferring protected data between layered data processing systems.
Figure 8:
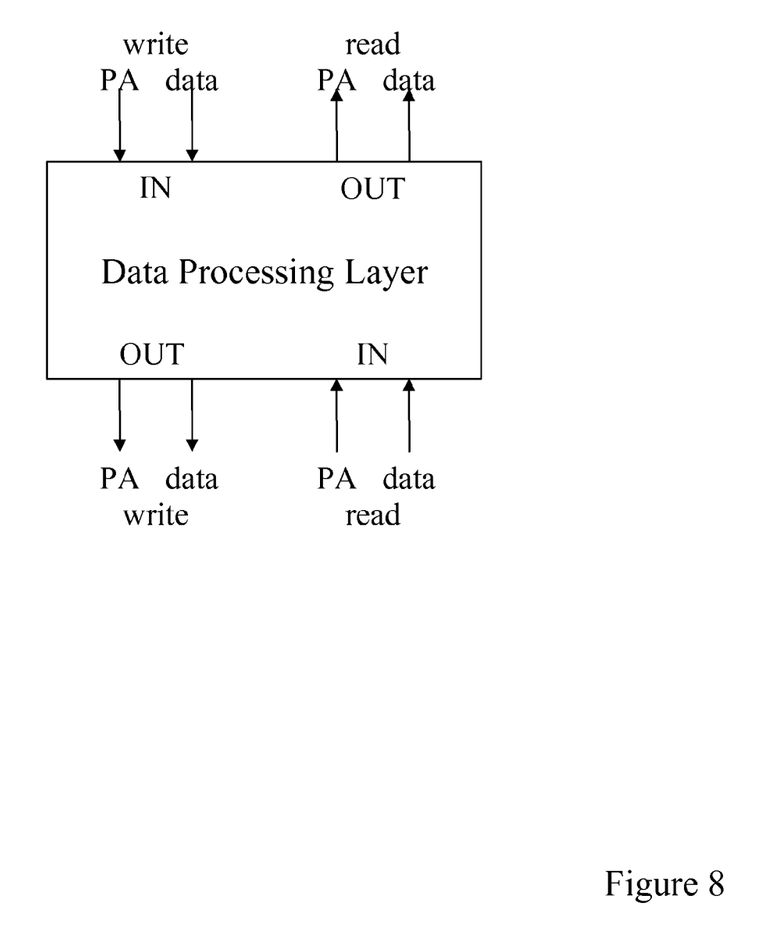
FIG. 8 shows an embodiment of a layer in a layered data processing system of the invention.

This invention is aimed at achieving faster and more efficient operations for moving data between layered data processing systems that use cryptographic protection internally. FIG. 6 shows an overview two data storage systems which are connected with each other through a trusted and an untrusted channel. Each of the data storage system is further connected to at least one trusted and at least one untrusted storage device. (The figure only shows one instance of the trusted and untrusted storage devices per data storage system). The data storage devices might be connected to further data storage devices not shown on the figure. As shown in FIG. 7, protected (i.e., encrypted or authenticated) data is transferred between data processing systems keeping the format of the protected data intact and adding protection attributes, such as encryption keys or message-authentication keys for a message-authentication code (MAC) separately. The invention is to enhance a layered data processing system to work with separate interfaces for data and protection attributes. More precisely, the invention enhances the interface of the layered data storage system by adding set of protection attributes (7.1), which express the cryptographic operations that were applied to the stored data at the time of storing it. Data that is modified in this way is called protected data. The protected data may have been encrypted with a symmetric cryptosystem or with an asymmetric cryptosystem. In this case, the protection attributes consist of the secret or of the public key that was applied to the data. Protected data may also be authenticated using a MAC or signed using a digital signature scheme. Here, the protection attributes include the secret MAC-key and the authentication tag or the digital signature and the signature private key. In this way it is possible to reconstruct the raw data from the protected data and the protection attributes such as message authentication code, encryption keys, digital signatures etc. Hence the protected data together with the protection attributes provide for a different representation of the data. Such cryptographically protected data can be represented as an abstract Crypto Container data type that separates between data and protection attributes. A crypto container consists of protection attributes and protected data. A protection attribute describes the cryptographic protection scheme that has been applied to the protected data in the container.

The protected data is then transferred to the second data processing system (7.2) in this form. The protection attributes are themselves not protected but exported and imported as they are (in cleartext). It must be ensured that the protection attributes are only exported in a trusted environment. Hence, if the environment consists of an untrusted data channel the transfer of protection attributes between data processing layers has to be done through a secure channel. Importing protected data is more efficient because it is not necessary to protect the data a second time. At the second system protection attributes alone are encrypted in the format of the second system (7.3). the unaltered data from the first system and the encrypted protection attributes are then stored on the second system (7.4)

FIG. 7 shows one layer of the enhanced data processing system. The layer now provides for a separation between protected data and protection attributes (PA) for the write input from above and for the read input from below, respectively. Likewise, the layer may output protected data separated from protection attributes for the write output to the lower layer and for the read output to the layer above.

Transmission of protected data between layered processing systems may involve a further layered data processing system that involves cryptographic protection. In this case, the cryptographic protection can be applied to the protection attributes, but may be skipped for the protected data, which is more efficient.

It should be noted that the said protected data and the said protection attributes together are not protected but provide for a different representation of the data. This is to allow reconstruction of the plain data from the protected data and the protection attributes.

The basic aim of the aforementioned representation of the data is to gain efficiency when transferring protected data between data processing systems with different protection schemes. The efficiency arises from the fact that the data to be exported from one data processing system to the target data processing system is not required to be decrypted at the first system and can be transferred in the original encrypted format along with the protection attributes.

The target data processing system does not need to encrypt the protected data again but can encrypt merely the protection attributes with a key owned by the target data processing system.

The advantage of this secure and efficient method for migration or transfer of data between data processing systems is that one can avoid going through the complicated decryption process before data migration between data processing systems.

Figure 9:
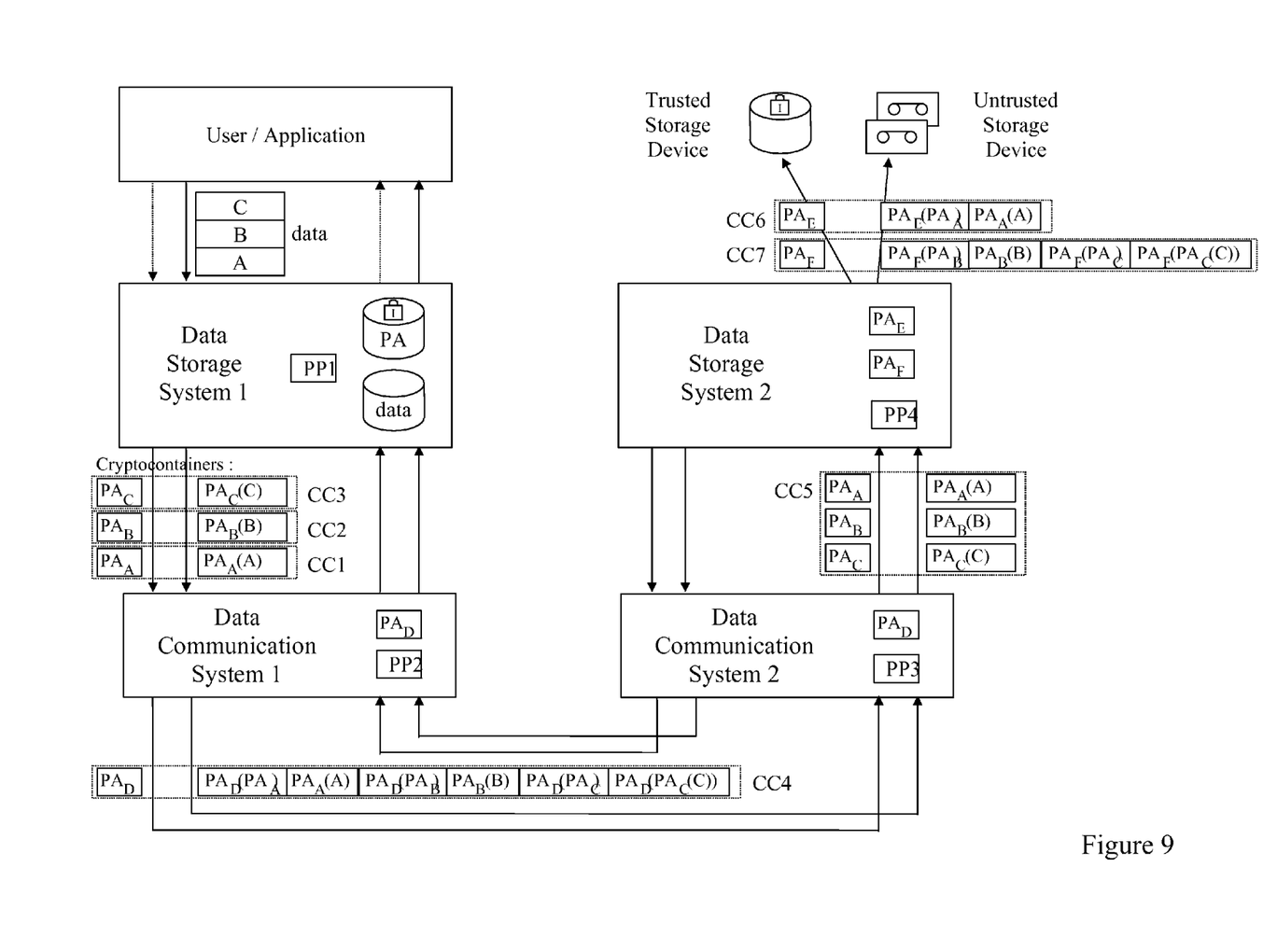
FIG. 9 shows an embodiment of two layered data storage system interconnected with a data communication system.

FIG. 9 shows a preferred embodiment of this invention consisting of at least two data storage systems, at least two data communication systems, at least one trusted and one untrusted storage device. A user or an application of the data storage system 1 writes data to the data storage system. To illustrate this, three data messages A, B, C are shown; however, any arbitrary number of data messages can be written to the data storage system. The protection of the data messages at this point is dependent on the configuration of the system and might be given through existing means such as login password or a Kerberos ticket (J. Kohl and C. Neuman, The Kerberos Authentication Service, RFC 1510, September 1993). The write connector for protection attributes is therefore dashed. The data storage system applies protection attributes to the entering data A, B, and C according to the protection policy PP1, stores the protection attributes on one or more trusted storage devices and stores the data on one or more untrusted storage devices. The process of applying the protection policies is explained later in this document. When the data has to be transferred through data communication systems to second data storage system the data storage system 1 writes the protection attributes $PA_A$, $PA_B$, and $PA_C$, and the protected data $PA_A(A)$, $PA_B(B)$, and $PA_C(C)$, as crypto containers CC1, CC2, and CC3 to the next layer.

Data communication systems 1 and 2 share the same crypto object attributes $PA_D$ which have been exchanged using any known key distribution protocol through a trusted channel. Upon receipt of one or more crypto containers the data communication system 1 may wrap several crypto containers into a single one or split crypto containers into two or more containers. It also may apply additional encryption based on the protection policy PP2. The actual start and end point of incoming crypto containers which go into a new outgoing crypto container CC4 depends on the functionality of the data communication system and is not further specified here. In the figure, the three crypto containers CC1-3 are wrapped into crypto container CC4, whereby the protection attributes are encrypted by the encryption attributes $PA_D$. The data which is already sufficiently protected according to PP2, here $PA_A(A)$ and $PA_B(B)$, are not reencrypted. Only $PA_C(C)$ which is not sufficiently protected is encrypted using the protection attributes $PA_D$. The new crypto container CC4 is then written to the next layer, residing in the data communication system 2. The data communication system 2 communicates with the data storage system 2 through a trusted environment. Therefore the crypto container CC4 can be unwrapped and no protection policies need to be applied to write the restored crypto container CC5 to the data storage system 2. Similar as above, the data storage system 2 may wrap or split crypto containers. In this embodiment the data storage system 2 illustrates a tape archival device which splits the crypto container CC5 into two different crypto containers CC6 and CC7. Here again, the data storage system may apply additional encryption based on the protection policy PP2 as it is shown for $PA_F(PA_C(C))$. For each crypto container the data is stored on a separate storage devices named tape devices whereas the crypto attributes $PA_E$ and $PA_F$ are stored on a trusted storage device. The read process is analogous to the write process and is not further explained here.

Figure 10:
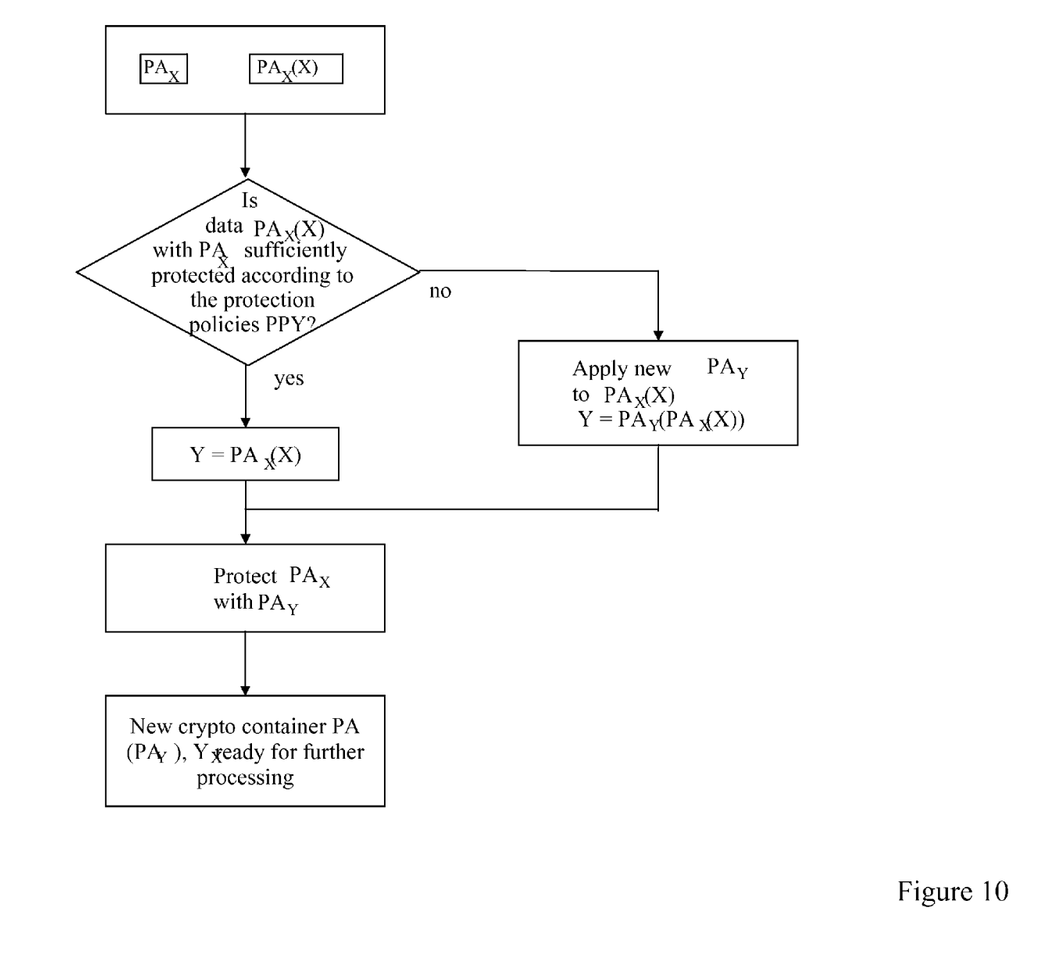
FIG. 10 shows an embodiment of the process applying protection policies in a data processing layer.

The process of applying protection policies in a data processing layer is shown in FIG. 10. A crypto container consisting of crypto attributes $PA_X$ and data $PA_X(X)$ is first checked whether the data $PA_X(X)$ is sufficiently protected according to the protection policies PPY of the data processing layer. If the data $PA_X(X)$ is not sufficiently protected the protection attributes $PA_Y$ provided by the current layer have to be applied to the data to build the new data $Y=PA_Y(PA_X(X))$. In a next step the protection attributes $PA_X$ of the crypto container are protected with the protection attributes of the data processing layer $PA_Y$. In case the data is already sufficiently protected, only the protection attributes $PA_X$ are protected with the protection attributes of the data processing layer $PA_Y$ and the new data $Y=P_A(X)$ remains unchanged. Finally the new crypto container $PA_Y(PA_X),Y$ is ready for further processing by the data processing layer.

Figure 11:
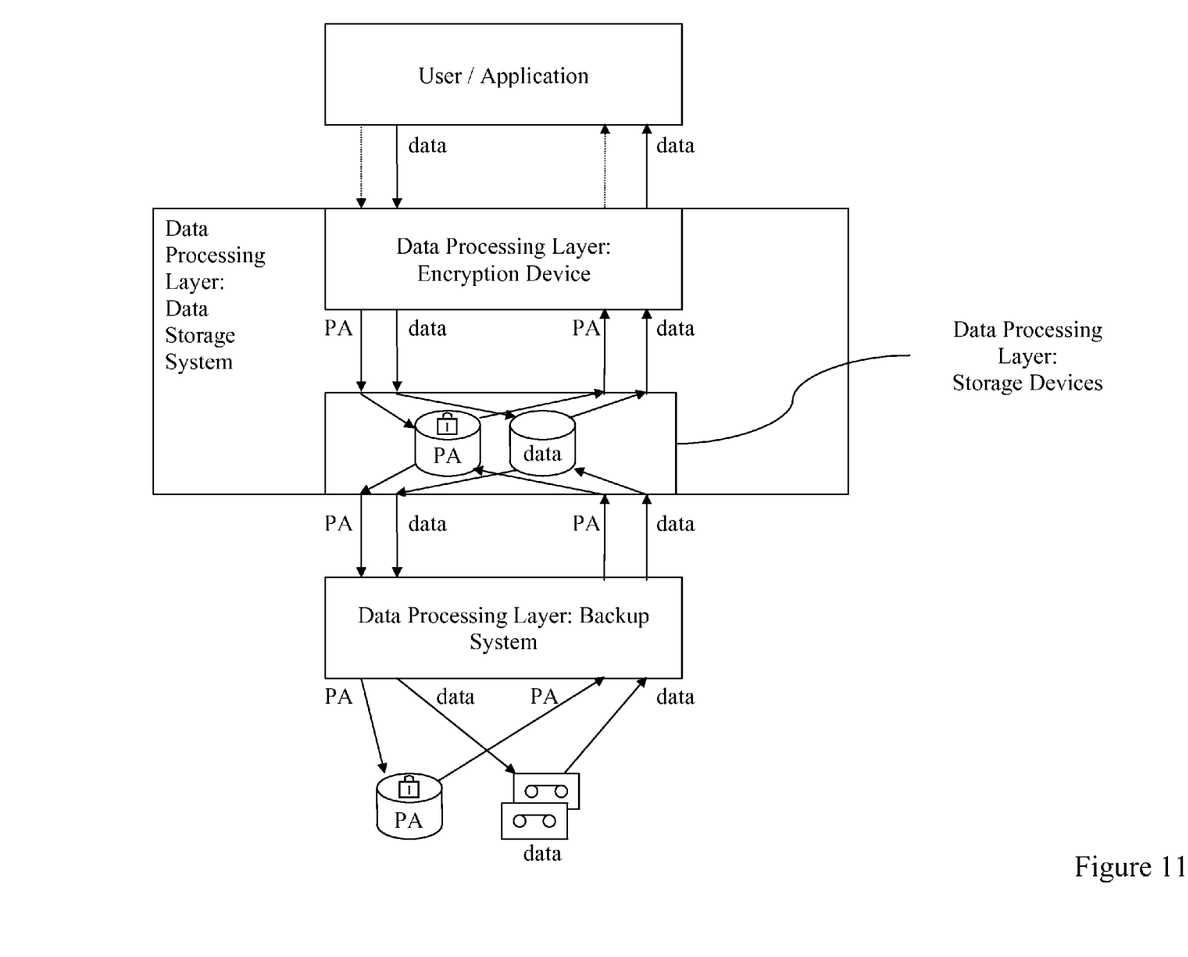
FIG. 11 shows an embodiment of a recursive data processing layer.

In another embodiment of the present invention one or more data processing layers may be merged into a single processing layer. FIG. 11 shows two data processing layer, a first one consisting of an encryption device and a second one of storage devices which are merged into one single data processing layer.

The above description related to specific embodiments of the invention and was described with the help of specific language for the purpose of promoting an understanding of the principles of the invention. It must nevertheless be understood that no limitation of the scope of the invention is thereby intended. The scope of the invention shall include such alterations and modifications in the embodiments and such further applications of the principles of the invention as would normally occur to one skilled in the art to which the invention relates.

We claim:

1. A computer-implemented system for transferring protected data between data processing systems of a computer data network, comprising:
    a first data processing system of a computer data network operable to retrieve encrypted data stored thereat, the encrypted data being encrypted at the first data processing system by cryptographic operations according to a first set of protection attributes, the first data processing system being operable to attach the first set of protection attributes to the retrieved encrypted data and transfer the encrypted data with the attached first set of protection attributes from the first data processing system to a second data processing system of the computer data network,
    the second data processing system being operable to receive the encrypted data with the attached first set of protection attributes from the first data processing system and to encrypt the received first set of protection attributes by cryptographic operations according to a second set of protection attributes different from the first set of protection attributes, the second data processing system being operable to store the encrypted first set of protection attributes and the received encrypted data in the encrypted form received from the first data processing system without decrypting the received encrypted data and without encrypting the received encrypted data according to the second set of protection attributes.

2. A data migration system for protected data as claimed in claim 1 wherein said first set of protection attributes includes an encryption key and said encrypted data are encrypted using said encryption key.

3. A computer-implemented method for transferring encrypted data stored at a first data processing system of a computer data network to a second data processing system of the computer data network, wherein the encrypted data has been encrypted using a first set of protection attributes including a first encryption key, said method comprising the steps of:
    at the first data processing system, retrieving the stored encrypted data and attaching a first set of protection attributes to the encrypted data, the first set of protection attributes including the first encryption key;
    without decrypting or re-encrypting the encrypted data, transferring the encrypted data from the first data processing system to the second data processing system with the attached first set of protection attributes;
    at the second data processing system, receiving said first set of protection attributes and encrypting said received first set of protection attributes in accordance with a second set of protection attributes including a second encryption key different from the first set of protection attributes and the first encryption key; and
    at the second data processing system, storing said encrypted first set of protection attributes in association with said transferred encrypted data without decrypting or re-encrypting said encrypted data.

4. A computer-implemented method for transferring authenticated data stored at a first data processing system of a computer data network to a second data processing system of the computer data network, wherein the authenticated data has been authenticated using a first authentication key, said method comprising the steps of:
    at the first data processing system, retrieving the stored authenticated data and attaching a first set of protection attributes to the retrieved authenticated data,
    without verifying authentication or re-computing authentication information of the retrieved authenticated data, transferring the authenticated data from the first data processing system to the second data processing system with the attached first set of protection attributes;
    at the second data processing system, receiving said first set of protection attributes and encrypting said received first set of protection attributes in accordance with a second set of protection attributes different from the first set of protection attributes; and
    at the second data processing system, storing said encrypted first set of protection attributes protected in association with said transferred authenticated data without verifying authentication or recomputing authentication information of said transferred authenticated data.

5. A method as claimed in claim 4, wherein said step of attaching said protection attributes comprises the step of including said first authentication key and wherein said step of receiving and encrypting said received first set of protection attributes includes encrypting said received first set of protection attributes with a second authentication key included in said second set of protection attributes.

* * * * *